United States Patent
Knibbe

(10) Patent No.: US 10,271,408 B2
(45) Date of Patent: *Apr. 23, 2019

(54) USER INTERFACE WITH POSITION AWARENESS

(71) Applicant: SIGNIFY HOLDING B.V., Eindhoven (NL)

(72) Inventor: Engel Johannes Knibbe, Heeze (NL)

(73) Assignee: SIGNIFY HOLDING B.V., Eindhoven (NL)

(*) Notice: Subject to any disclaimer, the term of this patent is extended or adjusted under 35 U.S.C. 154(b) by 159 days.

This patent is subject to a terminal disclaimer.

(21) Appl. No.: 14/948,445

(22) Filed: Nov. 23, 2015

(65) Prior Publication Data

US 2016/0077599 A1 Mar. 17, 2016

Related U.S. Application Data

(63) Continuation of application No. 12/097,927, filed as application No. PCT/IB2006/054795 on Dec. 13, 2006, now Pat. No. 9,474,134.

(30) Foreign Application Priority Data

Dec. 23, 2005 (EP) .................... 05112856

(51) Int. Cl.
*G06F 3/01* (2006.01)
*H04L 29/08* (2006.01)
(Continued)

(52) U.S. Cl.
CPC .......... *H05B 37/0272* (2013.01); *G01S 5/14* (2013.01); *G06F 3/017* (2013.01); *H04L 67/12* (2013.01); *G08C 2201/91* (2013.01)

(58) Field of Classification Search
CPC ....... G01S 5/14; G06F 3/017; G08C 2201/91; H04L 67/12; H05B 37/0272
See application file for complete search history.

(56) References Cited

U.S. PATENT DOCUMENTS 5,623,256 A 4/1997 Marcou
5,905,442 A 5/1999 Mosebrook et al.
(Continued)

FOREIGN PATENT DOCUMENTS

JP 10302507 A 11/1998
JP 2001143877 A 5/2001
(Continued)

OTHER PUBLICATIONS

Pasi Valkkynen, et al: Physical Interaction (PI03) Workshop on Real World User Interface, A User Interaction Paradigm for Physical Browsing and Near-Object Control Based on Tags, Workshop Proceedings, MobileHCI Conf. Sep. 2003, pp. 1-71.
(Continued)

*Primary Examiner* — Jennifer L Norton
(74) *Attorney, Agent, or Firm* — Meenakshy Chakravorty

(57) ABSTRACT

A remote control device for controlling lighting systems includes a sensor configured to determine a location of the remote control device in relation to the lighting systems. A controller is configured to determine a nearest light source of the lighting systems relative to the location of the remote control device and to control this nearest light source. The controller is configured to change a configuration of the remote control device in response to changing its location. A transceiver transmit a signal to multiple light sources which measure the strength and/or time of flight of this signal for use in determining the location of the remote control device. The light sources provide the remote control
(Continued)

device with identifying information unique to each one of them including their locations.

12 Claims, 1 Drawing Sheet

(51) Int. Cl.
*H05B 37/02* (2006.01)
*G01S 5/14* (2006.01)

(56) References Cited

U.S. PATENT DOCUMENTS

| | | | |
|---|---|---|---|
| 5,909,087 A | 6/1999 | Bryde et al. | |
| 6,107,938 A | 8/2000 | Du et al. | |
| 7,139,562 B2 | 11/2006 | Matsui | |
| 7,295,119 B2 | 11/2007 | Rappaport et al. | |
| 7,339,477 B2 | 3/2008 | Puzio et al. | |
| 7,712,670 B2 | 5/2010 | Sauerwein et al. | |
| 7,890,235 B2 | 2/2011 | Self et al. | |
| 8,884,744 B2 * | 11/2014 | Bellows | G06K 7/0008 235/385 |
| 2003/0057887 A1 | 3/2003 | Dowling et al. | |
| 2003/0107888 A1 | 6/2003 | Devlin et al. | |
| 2004/0003073 A1 | 1/2004 | Krzyzanowski et al. | |
| 2004/0121725 A1 | 6/2004 | Matsui | |
| 2005/0021158 A1 | 1/2005 | De Meyer et al. | |
| 2005/0047134 A1 | 3/2005 | Mueller et al. | |
| 2005/0071498 A1 | 3/2005 | Farchmin | |
| 2005/0094610 A1 | 5/2005 | de Clerq et al. | |
| 2008/0315772 A1 * | 12/2008 | Knibbe | G01S 13/825 315/149 |
| 2010/0213876 A1 | 8/2010 | Adamson et al. | |
| 2012/0235579 A1 | 9/2012 | Chemel et al. | |
| 2012/0264447 A1 * | 10/2012 | Rieger, III | G01S 5/0252 455/456.1 |
| 2015/0035656 A1 | 2/2015 | Franz et al. | |
| 2015/0181662 A1 | 6/2015 | Ghoshal | |
| 2016/0128121 A1 * | 5/2016 | Koriyama | G08C 17/02 455/41.2 |
| 2017/0162036 A1 * | 6/2017 | Agardh | G08C 17/02 |
| 2017/0223807 A1 * | 8/2017 | Recker | H05B 37/0272 |
| 2017/0277147 A1 * | 9/2017 | De Vaan | F24F 11/30 |

FOREIGN PATENT DOCUMENTS

| | | |
|---|---|---|
| JP | 2005259555 A | 9/2005 |
| JP | 2005185598 A | 10/2005 |
| JP | 2005293853 A | 10/2005 |
| WO | 2004100617 A1 | 11/2004 |

OTHER PUBLICATIONS

Ichiro Satoh: Location-Based Services in Ubiquitous Computing Environments, National Institute of Informatics, pp. 1-26.
Barry Brumitt, et al: Let There Be Light, Examining Interfaces for Homes of the Future, Microsoft Research, USA, pp. 1-8.
Lionel M. Ni, et al; Landmarc: Indoor Location Sensing Using Active RFID, Location-Aware Computing; Sensing Network; RFID; Signal Strength; Wireless Communication p. 1-10.
Tiiu Koskela, et al: Evolution Towards Smart Home Environments: Empirical Evaluation of three User Interfaces, Pers Ubiquit Comput, vol. 8, Jun. 23, 2004, pp. 134-240.
Boris De Ruyter: Challenges for End-User Development in CE Devices, Consumer Electronics (CE) Ambient Intelligence, Context Awareness, User Experience, Philips Research, pp. 1-4.

* cited by examiner

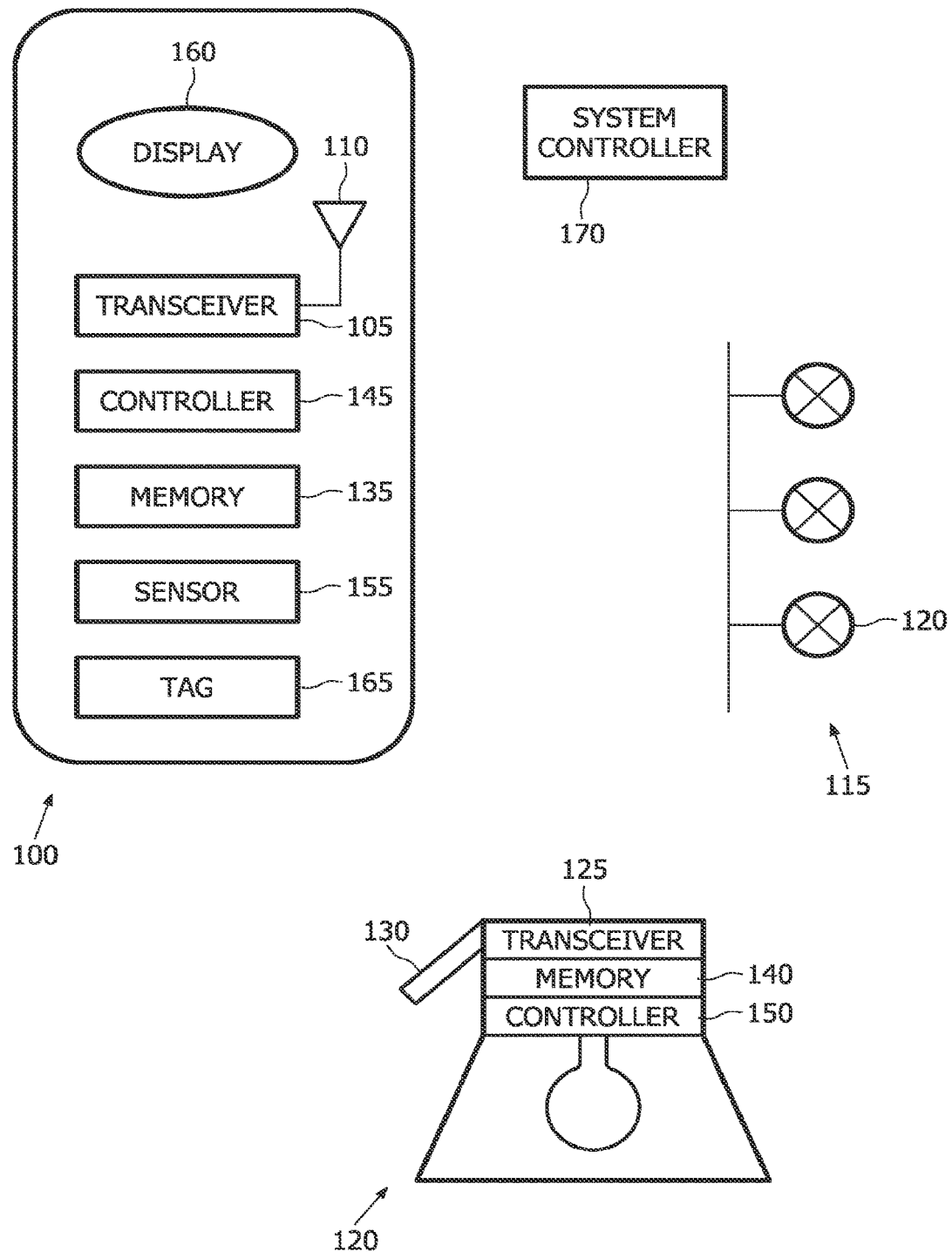

USER INTERFACE WITH POSITION AWARENESS

CROSS-REFERENCES TO RELATED APPLICATIONS

This application is a Continuation application of U.S. Ser. No. 12/097,927, filed on Jun. 18, 2008, which is the U.S. National Phase Application of International Application No. PCT/IB2006/054,795, filed on Dec. 13, 2006 and claims the benefit European Patent Application No. 05112856.9, filed on Dec. 23, 2005. These applications are hereby incorporated by reference herein.

In current lighting systems including multiple light sources, selection and control of the light sources usually occurs by fixed devices, such as wall panels having switches. Switches of the wall panel are used to control the light sources such as to turn lights on or off, or dim the lights. In the event a user desires to change any lights, the user must return to the wall panel. Of course, the user needs to know which switch controls which light source. However, often the user does not know such information as switches or light sources are not marked. Such a situation is particularly problematic in the case of multiple light sources and multiple switches, where the switch that controls the desired light source is found by trial and error.

Recent developments have created remote control devices useful for adjusting light sources. In this way, users can modify light sources without having to return to a wall panel. Current user interfaces with remote control capabilities for lighting systems are bulky and complex devices that are not user-friendly to operate. One known lighting remote control is disclosed in U.S. Pat. No. 5,909,087, which is incorporated herein by reference in its entirety. Other controlled lighting methods and devices are disclosed in U.S. Patent Application Publication No. 2005/0047134 and U.S. Pat. No. 6,107,938, which are each also incorporated herein by reference in their entirety.

However, the same problem exists in the event the environment contains multiple light sources, where control of the desired light source is often by trial and error. Typically, the user does not even want to know which lamp(s) he is controlling. Rather, the user is only interested in changing the light in a particular location, or towards a particular direction, and the lighting system should determine which lamps need to be changed. Accordingly, there is a need for a simple user interface for controlling one or more light sources.

A user interface device (UID), such as a remote control device for controlling lighting system is configured to change its functionality based on its location in relation to light sources of the lighting system, and to allow control of particular light sources. The remote control device determines its location in relation to the lighting systems, and determines at least the closest light source or fixture for control thereof. A controller of the remote control device is configured to change the configuration of the remote control device in response to changing its location. A transceiver transmits a signal to multiple light sources which measure the strength and/or time of flight of this signal for use in determining the location of the remote control device. The light sources provide the remote control device with identifying information unique to each one of them including their locations.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

These and other features, aspects, and advantages of the apparatus and methods of the present invention will become better understood from the following description, appended claims, and accompanying drawings where:

FIG. 1 shows the user interface device according to one embodiment of the present invention.

DETAILED DESCRIPTION

The following description of certain exemplary embodiment(s) is merely exemplary in nature and is in no way intended to limit the invention, its application, or uses. Throughout this description, the term "environment" shall refer to closed or semi-closed surroundings wherein the conditions and elements are subject to the control of a person or persons, including but not limited to, a room, several rooms with proximity to each other, a house, an office building, warehouses, retail or department stores and the like.

The term "lighting systems" includes, but is not limited to, one or more light fixtures, luminaries, light sources, accent lighting, general lighting, track lighting, table-top lighting, ceiling lighting, spot lighting, and the like.

"User Interface Device" (UID) or "remote control device" refers to devices that are configured for wireless operation, including, but not limited to, handheld devices, remote controllers, personal digital assistants (PDAs), mobile phones, and the like. Wireless communication may be via any means, such as radio frequency (RF), infrared, ultrasound, laser and the like.

The functionality of the remote control device or UID is changed based on its proximity to a light fixture. As shown in FIG. 1, the UID 100 has a transceiver 105 coupled to an antenna 110 for wireless communication with one or more lighting systems 115 that include one or more light sources 120, one of which is shown in greater detail and also includes a transceiver 125 coupled to an antenna 130 for wireless communication with the UID 100. The lamp transceiver 125 may be embedded in a ballast, controller 150 or electronic circuits associated with the light source or fixtures 120. For example, the UID 100 and lighting systems 115 communicate wirelessly via limited range technology such as Zigbee™ or Bluetooth™ protocols.

The UID 100 has a memory 135 that stores UID identifying information as well as information that associates various parameters, presets and modes of operation with different lighting systems 115, a group of light fixtures 120 within a lighting system 115, or individual light fixtures 120. For clarity, a light fixture will be used to refer to one light fixture, a group of light fixtures, or one or more lighting systems. Modes of operation and presets associated with a light fixture 120 include variations possessed by the light fixture 120 as stored in a lamp memory 140 by the manufacturer/developer or user of the light fixture 120, which may also be modified by the user. The lamp memory 140 may also include other various data, such as identifying information unique to the light fixture. Of course, any needed data may be stored in the memories 135, 140 of the UID 100 and light fixture 120, such as operating instructions of a UID controller 145 and lamp controller 150.

Examples of different modes of operation and presets include, but are not limited to, modes related to user controllable light parameters or attributes, such as light intensity, color, hue and saturation; application control including beam direction, beam width, and spot size; as well as a follow-me mode, where different lights are controlled, e.g., turned on/off/dimmed/change color in accordance with presets, for example, as the remote control is moved from one location to another so that a desired light follows the UID 100. Presets may include predetermined attributes associated with different setting, such as for romance, TV watching, reading and the like, as disclosed in US 2003/0107888, which is incorporated herein by reference in its entirety.

The UID 100 transmits a signal either periodically, continuously, upon user activation, or upon entering a zone or range of a signal transmitted by the lamp transceiver 125. Upon detection of the UID signal when the UID 100 is in range of the lighting systems 115, the light fixtures 120 transmit lamp signals that include their unique identity as well as their locations which may be pre-stored in the lamp memory 140. Of course, the light fixtures 120 may transmit such lamp signals periodically, continuously, or upon user activation.

The UID 100 includes a sensor 155 that, alone or in combination with the UID controller or processor 145, determines the location of the UID 100 from the lamp signals received by the UID transceiver 105. The lamp signals include lamp IDs, locations, and received signal strength or time of flight (from which distance information can easily be obtained) of the UID signal to the various light fixtures 120, where algorithm using triangulation may be used to determine the UID location as well as the location of the nearest lamp fixtures 120. Of course, such algorithm may be included in one, some or all of the lamp fixtures 120, or in a separate controller/processor 170 that determines the UID location and sends it to the UID 100.

Using the determined UID location and locations of the light fixtures 120, the UID controller 145 determines the nearest light source relative to the UID's determined location and controls this nearest light source, such as turning on/off this nearest light source and/or controlling various light parameters or attributes as described including light intensity, color, hue, saturation, beam direction, beam width. It should be noted that communication to control the light sources may be the same or different from communication to locate the UID.

Further, the UID 100 reconfigures itself to effectuate proper control of the nearest light source to change any light parameters in addition to intensity, color, hue and saturation, such as beam direction, beam width, which may be through control of a motor and/or filter device of the light fixture for pan and tilt operation, for example. Alternatively or in addition, the UID 100 may reconfigure itself by recalling presets stored in its memory 135 associated with the particular nearest light source(s), or stored in the lamp memory 140 (of this nearest light source) and transmitted to the UID 100. Thus, the UID 100 uses detailed location awareness to change its own functionality depending on its specific location relative to light fixtures, and controls the related light fixtures, such as the nearest light fixture of set of light fixtures.

As described, the UID controller 145, lamp controller 150, or a separate controller 170 which may be a stand alone controller, or part of another device, such as a personal computer for example, includes algorithms that calculate the UID location or its distance relative to the light fixtures 120 by triangulating relevant data, such as received fixture identifying data (i.e., fixture IDs), signal strengths or time of flight of signals from the UID 100 to multiple fixtures 120, or signals from the multiple fixtures 120 to the UID 100, for example. The location may be determined in two dimensions, or for greater accuracy, in three dimensions. The algorithm can determine locations by comparing ID and location information received from the light sources, such as based on measuring the signal strength and/or the time of flight of the signals transmitted by each light fixture 120 and received the UID transceiver 105. Further, instead of or in addition to triangulation, beam direction can be used, such as when the UID transceiver 105 receives a signal from one light fixture 120 and determines its signal strength or time of flight.

Instead of the UID transceiver 105, or in addition thereto, a radio frequency identification (RFID) tag 165 may be included in the UID 100, where the RFID tag may be passive or active. Additional information regarding the use of RFID technology for determining the location of an RFID tag within a particular area is disclosed in the published technical report entitled, LANDMARC: Indoor Location Sensing Using Active RFID, by Lionel M. N I, et al., which is incorporated by reference herein in its entirety. Of course, instead of an RFID tag, an ultrasound tag and/or an infrared tag may be used.

The light sources may be any kind of light source that can provide lights of various attributes, such as various intensity levels, different colors and the like, such as incandescent, fluorescent, halogen, or high intensity discharge (HID) light, which may have a ballast for control of the various light attributes. Light emitting diodes (LEDs) are particularly well suited light sources as they easily can be configured to provide light with changing colors, and typically have electronic circuitry for control of the various light attributes.

Thus, the UID 100 uses detailed location awareness information to change its own functionality depending on its specific location relative to light fixtures, and takes control of the related light fixtures, such as the nearest light fixture or set of light fixtures. The UID 100 operates on the closest lamp fixture and related lamp fixtures for a certain functionality, which may be different for the different lamp fixtures in the near vicinity of the UID 100, especially in view of the particular location of the UID 100 and the locations and types/IDs of the lamp fixtures themselves, such as for providing accent lighting, general lighting, white board lighting, wall washing with desired colors and intensity, and the like. The UID 100 may also be configured to control the directivity of the lamps towards the area identified by the location of the UID 100, including following the UID 100 as it is moved, referred to as a 'follow me' feature, where the light from light fixtures follow the UID 100 by changing direction and/or turning on/off different light fixtures.

Additionally feedback may be included. For example, the UID may provide an indication as to which light fixture(s) is detected as being nearest and/or is to be or is being controlled. The UID 100 may also provide feedback information to the user as to its mode of operation, its configuration, functionality, and current presets. The feedback information may be in the form of a display, voice, or other audio/visual prompts.

For example, the UID 100 may have a display 160 that is configured to display a map of the local area upon detection of the location of the UID 100 in this local area, where the map also includes indications of the location of the UID 100 and light fixtures 120 located within the local area displayed on the map. The display may be touch sensitive so that a user can navigate through the map or displayed menu items to select desired lamp fixture(s) for control, as well as to select the particular light attributes or presets to effectuate a desired lighting condition. The user may also control the UID 100 itself through the touch sensitive display for example or any other interface means, such as through buttons. Such UID control includes application controls, modifying presets, entering and storing new presets, and manually changing configuration of the UID 100 and/or light fixtures, and selecting the various presets and modes such as the follow-me mode and the like.

Determining the location of the UID 100 and the nearest light source(s) 120, as well as reconfiguration of the UID in accordance with its location and control of light attribute of the nearest light source(s) 120 are suited to be carried out by a computer software program running on the system controller 170 or UID controller 145, for example. Such software can of course be embodied in a computer-readable medium, such as an integrated chip, a peripheral device or memory of the system controller 170 or memory 135 of the UID 100, which may include a dedicated processor for performing in accordance with the present invention, or may be a general-purpose processor wherein only one of many functions operates for performing in accordance with the present invention. The processor may operate utilizing a program portion, multiple program segments, or may be a hardware device utilizing a dedicated or multi-purpose integrated circuit. Each of the above systems utilized for identifying the UID as well as the presence and identity of various light fixtures may be utilized in conjunction with further systems.

The various controllers may be any type of controller or processor, such as those described in U.S. 2003/0057887, that is capable of providing control signals in response to input signals from the UID 100, executing instruction stored in the memory 135, for example, which may be any type of memory, RAM, ROM, removable memory, CD-ROM, and the like, also as described in U.S. 2003/0057887. The various circuit elements may be integrated together in any combinations or may be separate units interconnected together.

Finally, the above-discussion is intended to be merely illustrative of the present invention and should not be construed as limiting the appended claims to any particular embodiment or group of embodiments. Thus, while the present invention has been described in particular detail with reference to specific exemplary embodiments thereof, it should also be appreciated that numerous modifications and changes may be made thereto without departing from the broader and intended spirit and scope of the invention as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) each of the disclosed elements may be comprised of hardware portions (e.g., discrete electronic circuitry), software portions (e.g., computer programming), or any combination thereof.

What is claimed is:

1. A user interface device (UID) for controlling one or more lighting systems having one or more light sources, the UID comprising:
    a sensor determines a location of the UID in relation to said one or more lighting systems, said sensor determines said location based on information carried in one or more signals emitted by the one or more light sources, said one or more light sources measures at least one of a strength and a time of flight of a UID signal from said UID and sends said measured at least one of strength and time of flight of said UID signal to the UID which determines said location of the UID, wherein the one or more light sources communicate wirelessly with the UID: and
    a controller determines at least a nearest light source of said one or more lighting systems relative to said location of said UID and controls at least one lighting attribute of said nearest light source in accordance with said location based on parameters, presets or modes of operation associated with the nearest light source or with a group of light sources including the nearest light source.

2. The user interface device of claim 1, wherein said controller changes a configuration of said UID in response to changing said location of said UID.

3. The user interface device of claim 1, wherein said at least one lighting attribute includes at least one of a preset, brightness, color, saturation, direction, beam width and spot size.

4. The user interface device of claim 1, further comprising a transceiver which transmits the UID signal to said one or more light sources of said one or more lighting systems.

5. The user interface device of claim 1, further comprising a transceiver which emits the UID signal to communicate with said one or more light sources of said one or more lighting systems, said one or more light sources providing said UID with identifying information unique to different one of said one or more light sources or to different sets of said one or more light sources.

6. The user interface device of claim 5, wherein said location is determined by measuring strengths of signals including said identifying information and measuring time of flight of said signals.

7. The user interface device of claim 1, wherein said controller determines a location of said nearest light source by comparing information received from a plurality of light sources of said lighting systems.

8. The user interface device of claim 1, further comprising a memory that stores different presets associated with different light sources of said one or more lighting systems or to different sets of said light sources.

9. A method in a user interface device (UID) for controlling lighting systems having one or more light sources, wherein said method comprises:
    determining a location of the UID in relation to said one or more lighting systems based on information carried in one or more signals emitted by the one or more light sources, said one or more light sources measures at least one of strength and time of flight of a UID signal from said UID and sends said measured at least one of strength and time of flight of said UID signal to the UID which determines said location of the UID, wherein the one or more light sources communicate wirelessly with the UID;

determining at least a nearest light source of said lighting systems relative to said location of said UID; and controlling at least one lighting attribute of said nearest light source in accordance with said location based on parameters, presets or modes of operation associated with the nearest light source or with a corresponding group of light sources including the nearest light source.

10. The method of claim 9, further comprising changing a configuration of said UID in response to changing said location of said UID.

11. The method of claim 9, further comprising:
transmitting the UID signal from a transceiver in said UID to a plurality of light sources of said lighting systems.

12. The method of claim 9, further comprising displaying a map of a local area, said map including at least one of an indication of said location of said UID and positions of said one or more light sources.

\* \* \* \* \*